United States Patent
Sawai

(10) Patent No.: US 9,320,045 B2
(45) Date of Patent: Apr. 19, 2016

(54) COMMUNICATION CONTROL DEVICE, COMMUNICATION CONTROL METHOD, AND COMMUNICATION CONTROL PROGRAM

(71) Applicant: Sony Corporation, Tokyo (JP)

(72) Inventor: Ryo Sawai, Tokyo (JP)

(73) Assignee: Sony Corporation, Tokyo (JP)

( * ) Notice: Subject to any disclaimer, the term of this patent is extended or adjusted under 35 U.S.C. 154(b) by 38 days.

(21) Appl. No.: 14/378,517

(22) PCT Filed: Dec. 26, 2012

(86) PCT No.: PCT/JP2012/083670
§ 371 (c)(1),
(2) Date: Aug. 13, 2014

(87) PCT Pub. No.: WO2013/125151
PCT Pub. Date: Aug. 29, 2013

(65) Prior Publication Data
US 2015/0017996 A1    Jan. 15, 2015

(30) Foreign Application Priority Data

Feb. 20, 2012  (JP) .................................. 2012-033854

(51) Int. Cl.
*H04W 72/08* (2009.01)
*H04W 52/24* (2009.01)
(Continued)

(52) U.S. Cl.
CPC ............ *H04W 72/082* (2013.01); *H04W 16/10* (2013.01); *H04W 52/244* (2013.01); *H04W 72/0473* (2013.01); *H04W 16/32* (2013.01)

(58) Field of Classification Search
None
See application file for complete search history.

(56) References Cited

U.S. PATENT DOCUMENTS

| 2010/0087203 A1* | 4/2010 | Lee .................... H04W 72/082 455/452.2 |
| 2010/0151876 A1* | 6/2010 | Park .................... H04W 72/082 455/452.2 |

(Continued)

FOREIGN PATENT DOCUMENTS

| GB | 2480689 | 11/2011 |
| JP | 2011-211369 A | 10/2011 |

(Continued)

OTHER PUBLICATIONS

Murakami et al., "Effective Region Analysis of 1-12 Spatial Domain Resource Sharing for Overlapping Cell", ITE Technical Report, Feb. 2, 2011, vol. 35, No. 5, pp. 31 to 36. (English translation of abstract at p. 31 of the document).

(Continued)

*Primary Examiner* — Ashish K Thomas
(74) *Attorney, Agent, or Firm* — Sony Corporation

(57) ABSTRACT

Provided is a communication control device including an allocation unit that allocates transmit power to each of one or more small cells so as to moderate interference on a macro cell of a radio communication system from each small cell that at least partially overlaps with the macro cell, a judgment unit that, in a case in which there exists a second small cell that exerts interference exceeding an allowed level on a first small cell, judges whether the interference is unidirectional or bidirectional, and a control unit that controls the interference between the first small cell and the second small cell with a technique that differs according to a judgment result by the judgment unit.

12 Claims, 11 Drawing Sheets

(51) Int. Cl.
*H04W 72/04* (2009.01)
*H04W 16/10* (2009.01)
*H04W 16/32* (2009.01)

(56) References Cited

U.S. PATENT DOCUMENTS

| | | | |
|---|---|---|---|
| 2010/0273432 A1 | 10/2010 | Meshkati et al. | |
| 2011/0292890 A1 | 12/2011 | Kulkarni et al. | |
| 2011/0310829 A1* | 12/2011 | Ji | H04L 5/0037 370/329 |
| 2013/0044736 A1* | 2/2013 | Tanaka | H04W 16/12 370/336 |
| 2013/0136029 A1* | 5/2013 | Matsuo | H04W 24/10 370/252 |
| 2014/0016598 A1* | 1/2014 | Kwon | H04L 5/0023 370/329 |
| 2015/0045049 A1* | 2/2015 | Sawai | H04W 52/244 455/452.1 |
| 2015/0094075 A1* | 4/2015 | Sawai | H04W 84/10 455/452.1 |
| 2015/0271848 A1* | 9/2015 | Gerasimenko | H04W 12/00 370/338 |

FOREIGN PATENT DOCUMENTS

| | | |
|---|---|---|
| JP | 2011-259425 A | 12/2011 |
| WO | 2011/117729 A | 9/2011 |

OTHER PUBLICATIONS

International Search Report corresponding to PCT/JP2012/083670, dated Apr. 2, 2013, 1 pg.

Murakami et al., "Effective Region Analysis of 1-12 Spatial Domain Resource Sharing for Overlapping Cell", ITE Technical Report, Feb. 2, 2011, vol. 35, No. 5, pp. 31 to 36.

Huawei et al, "Interference Scenario Analysis in Furthrer EICIC", 3GPP TSG RAN WG1 Meeting #66, Aug. 22-26, 2011, pp. 5, vol. RAN WG1, Athens, Greece.

Roshini Srinivasan et al, "IEEE 802.16M System Description Document (SDD)", Dec. 21, 2010, pp. 170, vol. 802.16M, No. R4, IEEE-SA, Piscataway, NJ, USA.

European Search Report Received for EP Patent Application No. 12869574.9, mailed on Dec. 17, 2015, pp. 13.

* cited by examiner

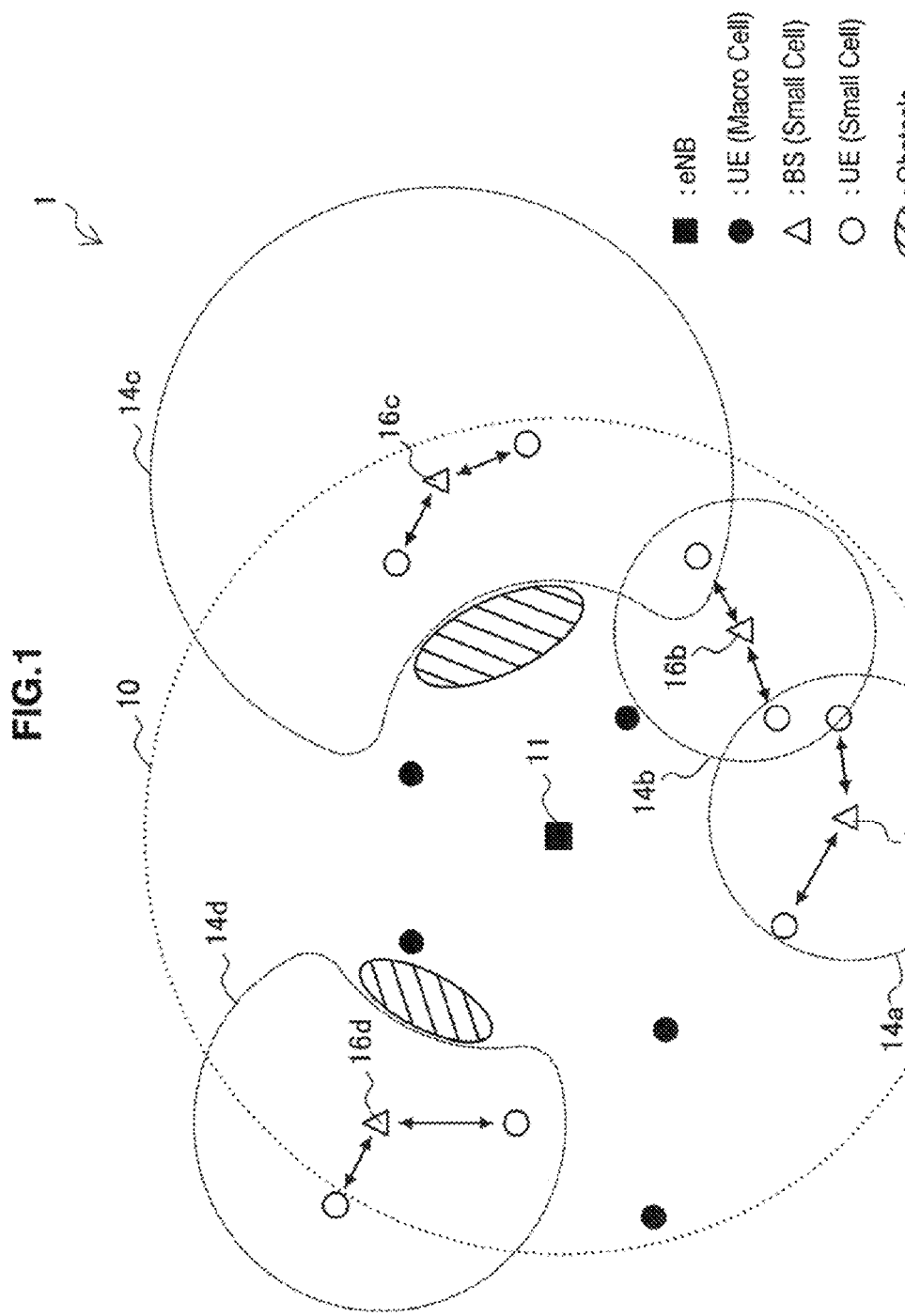

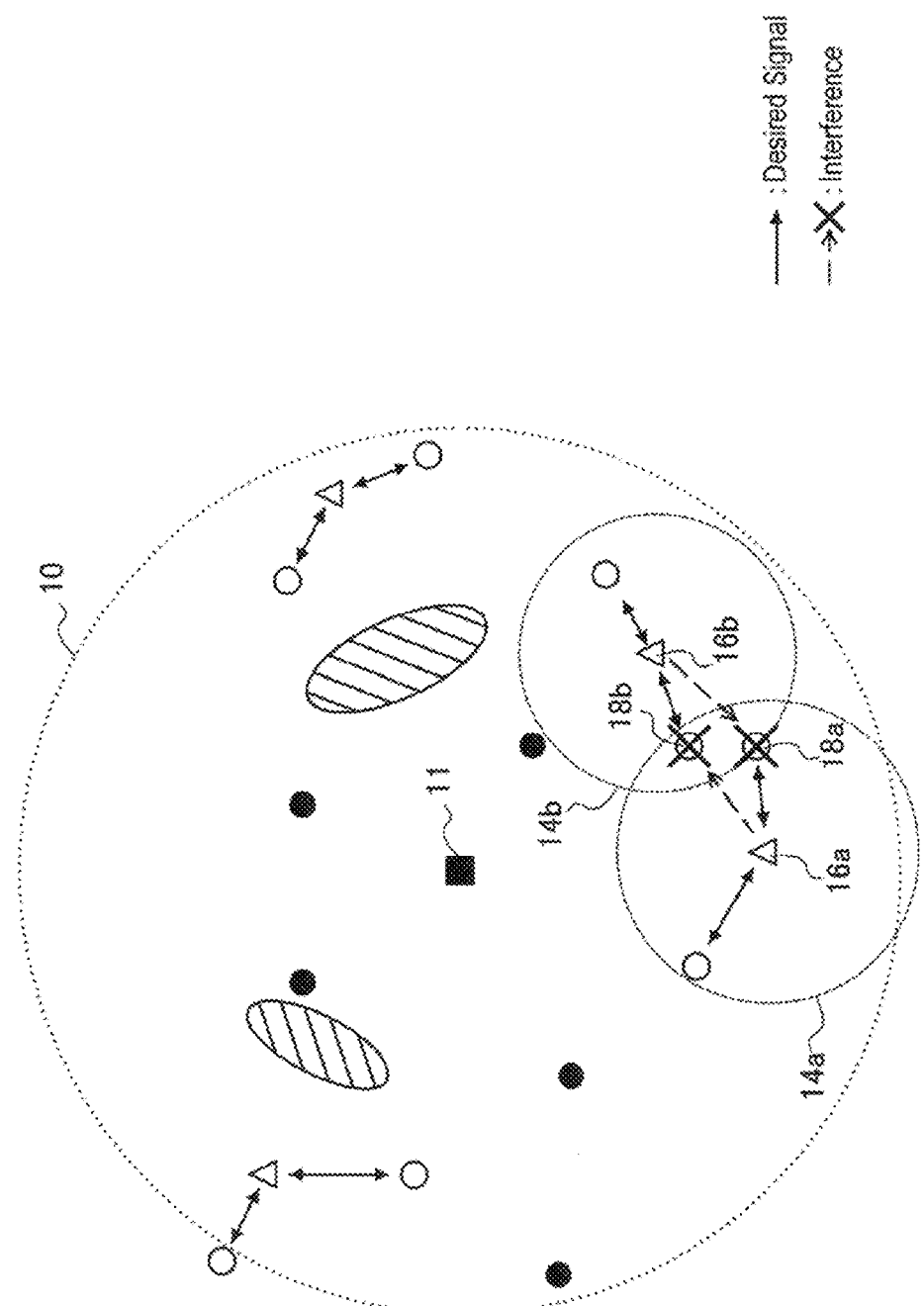

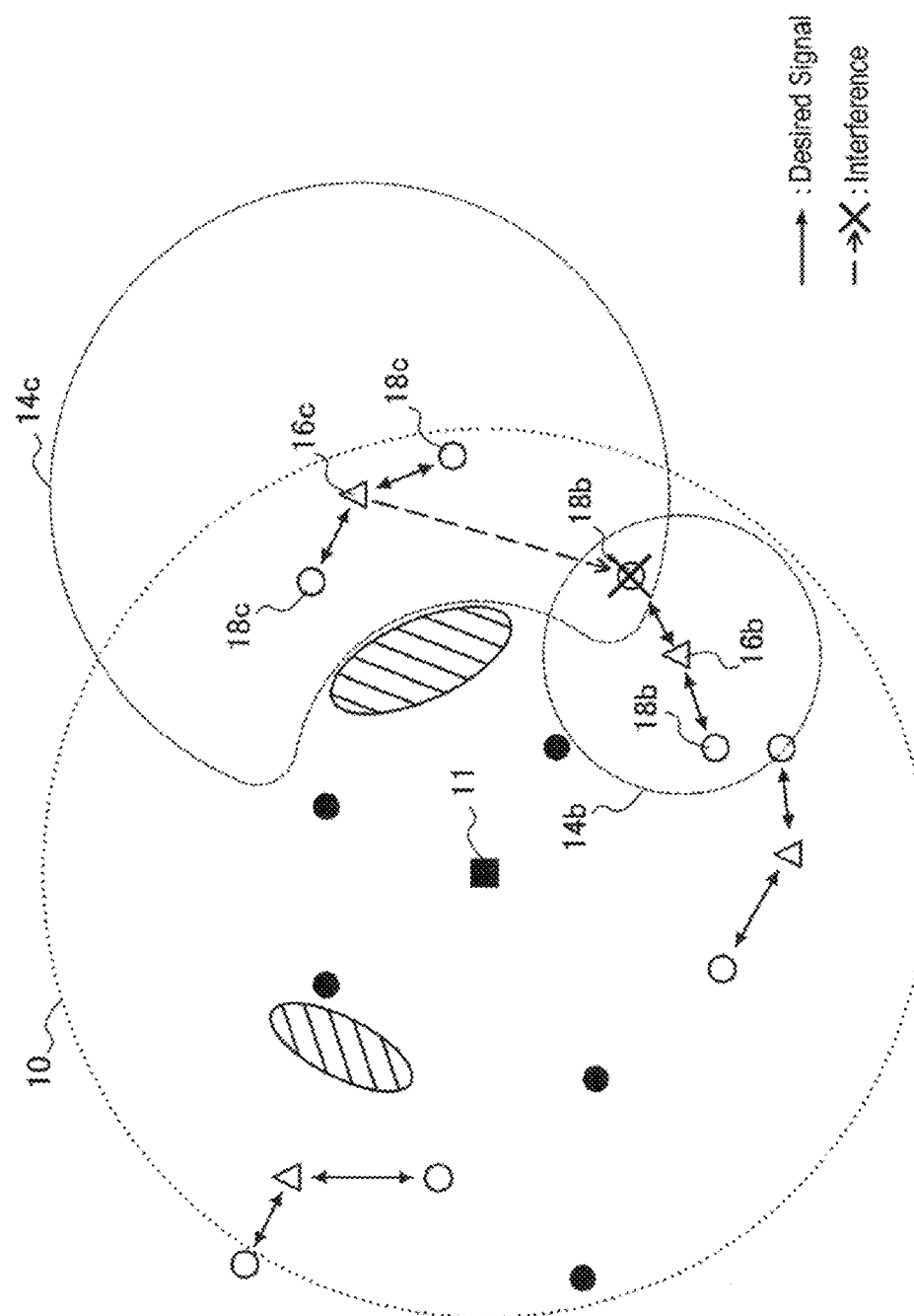

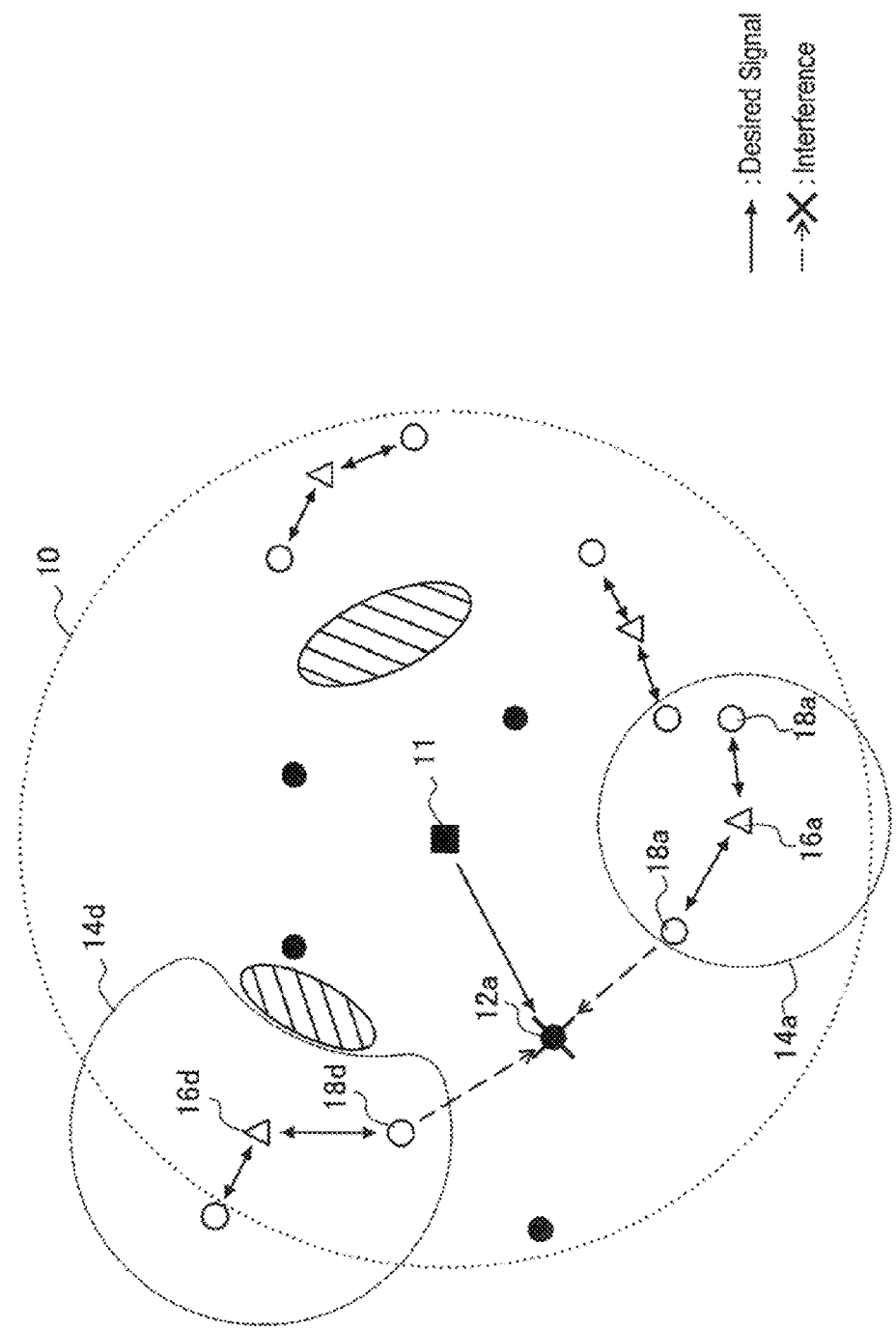

FIG.6

| INTERFERENCE CASE | CLASSIFICATION CRITERIA | INTERFERENCE CONTROL SCHEME EXAMPLE |
|---|---|---|
| A | • RATIO OF RESOURCES WITH INTERFERENCE EXCEEDING ALLOWED LEVEL IS EQUAL TO OR GREATER THAN THRESHOLD VALUE<br>• INTERFERENCE IS BIDIRECTIONAL | • ROUND-ROBIN RESOURCE DISTRIBUTION<br>• PRIORITIZED RESOURCE DISTRIBUTION |
| B | • RATIO OF RESOURCES WITH INTERFERENCE EXCEEDING ALLOWED LEVEL IS EQUAL TO OR GREATER THAN THRESHOLD VALUE<br>• INTERFERENCE IS NUIDIRECTIONAL | • DECREASE POWER ON INTERFERING SIDE<br>• LIMIT SCHEDULING |
| C | • CUMULATIVE INTERFERENCE EXCEEDING ALLOWED LEVEL ON MACRO CELL IS PRODUCED | • INCREASE INTERFERENCE IMMUNITY OF MACRO CELL SIGNAL<br>• LIMIT SCHEDULING ON INTERFERING SIDE |

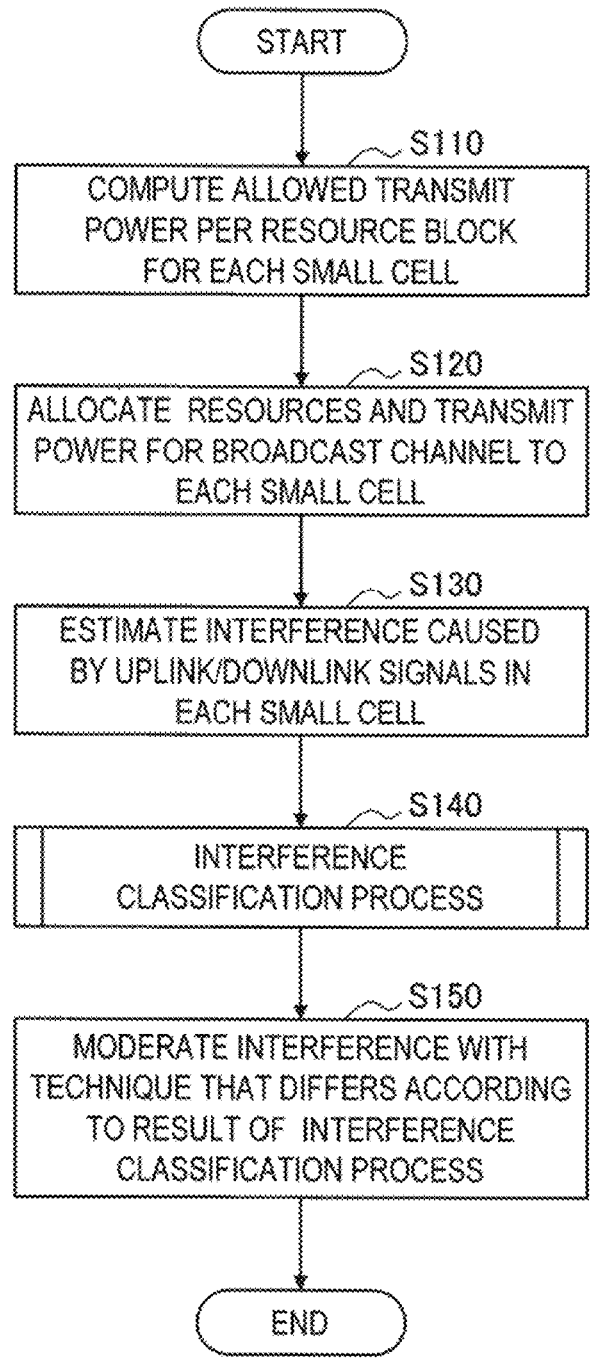

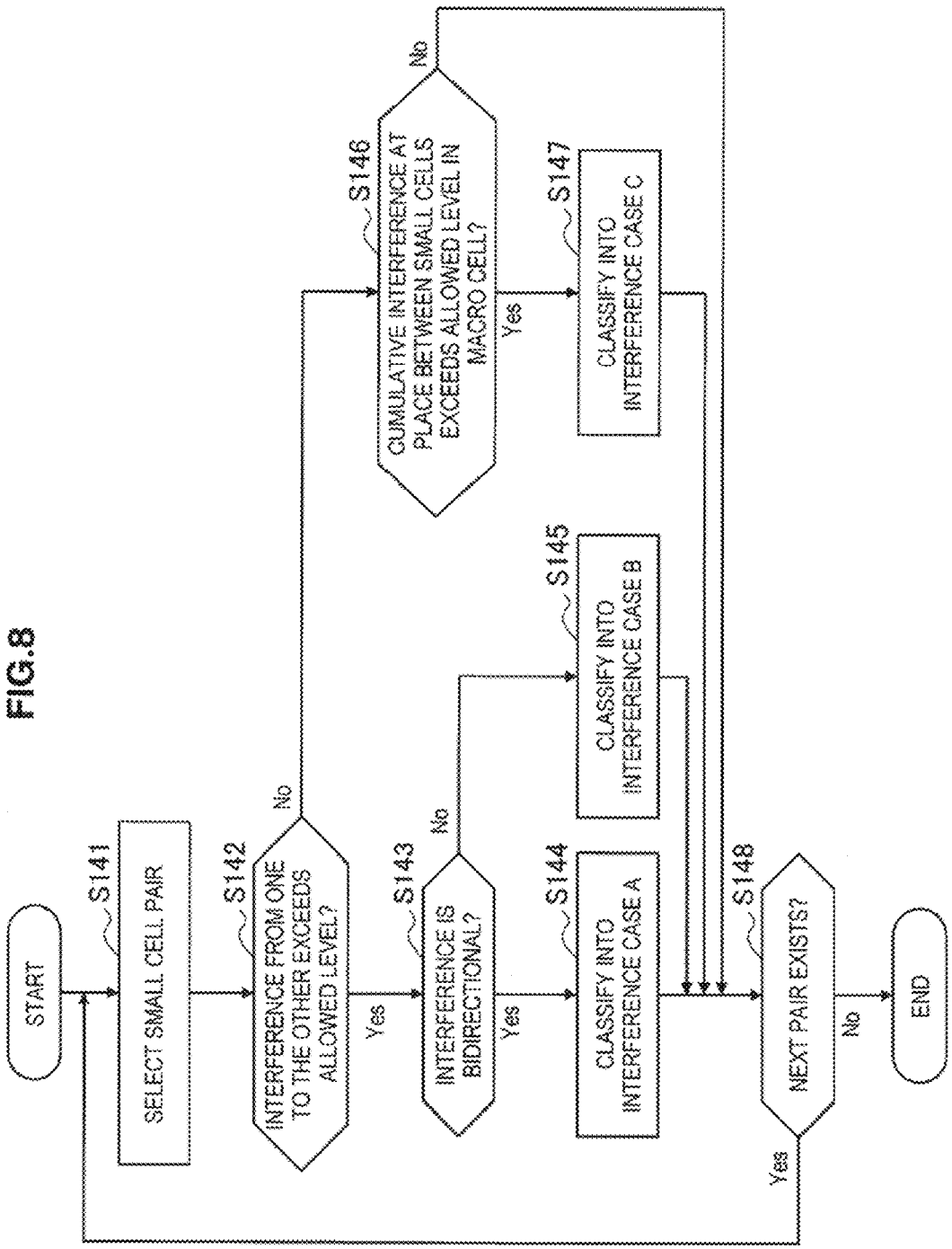

COMMUNICATION CONTROL DEVICE, COMMUNICATION CONTROL METHOD, AND COMMUNICATION CONTROL PROGRAM

CROSS-REFERENCE TO RELATED APPLICATION

The present application is a national phase entry under 35 U.S.C. §371 of International Application No. PCT/JP2012/083670 filed Dec. 26, 2012, published on Aug. 29, 2013 as WO 2013/125151 A1, which claims priority from Japanese Patent Application No. JP 2012-033854 filed in the Japanese Patent Office on Feb. 20, 2012.

TECHNICAL FIELD

The present disclosure relates to a communication control device, a communication control method, and a communication control program.

BACKGROUND ART

Recently, high-speed cellular radio communication schemes such as Long Term Evolution (LTE) and WiMAX are being practically implemented, and the communication rate of radio communication services enjoyed by mobile users has greatly improved. Furthermore, if fourth-generation cellular radio communication schemes such as LTE-Advanced (LTE-A) are introduced, an even greater improvement in communication rate is anticipated.

On the other hand, the number of mobile users is increasing rapidly, and the usage of applications demanding high data rates is becoming more widespread. As a result, the development of cellular radio communication schemes is not fully satisfying all mobile users' needs. Consequently, in order to supplement macro cells and increase communication capacity, the introduction of small cells is being advanced. Small cells are a concept that encompasses femto cells, nano cells, pico cells, micro cells, and the like. Small cells are typically introduced by installing a base station (also called an access point) that is small compared to a macro cell base station (for example, an evolved Node B (eNB) in LTE). However, in areas where a macro cell and a small cell overlap, there is a risk of radio signals transmitted and received by the small cell interfering with a terminal connected to the macro cell.

In order to avoid the risk of interference due to the introduction of small cells, Patent Literature 1 below proposes a technique that cooperatively controls the transmit power and transmission rate of a macro cell and a small cell.

CITATION LIST

Patent Literature

Patent Literature 1: JP 2011-211369A

SUMMARY OF INVENTION

Technical Problem

However, when envisioning conditions in which multiple small cells are present, the technique of moderating interference by considering only the relationship between macro cell and small cell is insufficient at avoiding the risk of interference.

Consequently, it is desirable to provide a mechanism enabling inter-cell interference to be suitably moderated under conditions in which multiple small cells are present.

Solution to Problem

According to the present disclosure, there is provided a communication control device including an allocation unit that allocates transmit power to each of one or more small cells so as to moderate interference on a macro cell of a radio communication system from each small cell that at least partially overlaps with the macro cell, a judgment unit that, in a case in which there exists a second small cell that exerts interference exceeding an allowed level on a first small cell, judges whether the interference is unidirectional or bidirectional, and a control unit that controls the interference between the first small cell and the second small cell with a technique that differs according to a judgment result by the judgment unit.

According to the present disclosure, there is provided a communication control method including allocating transmit power to each of one or more small cells so as to moderate interference on a macro cell of a radio communication system from each small cell that at least partially overlaps with the macro cell, judging, in a case in which there exists a second small cell that exerts interference exceeding an allowed level on a first small cell, whether the interference is unidirectional or bidirectional, and controlling the interference between the first small cell and the second small cell with a technique that differs according to a result of the judging.

According to the present disclosure, there is provided a communication control system including base stations of a first small cell and a second small cell that at least partially overlap with a macro cell of a radio communication system, and a communication control device that includes an allocation unit that allocates transmit power to each of the first small cell and the second small cell so as to moderate interference from the first small cell and the second small cell on the macro cell, a judgment unit that, in a case in which one of the first small cell and the second small cell exerts interference exceeding an allowed level on the other, judges whether the interference is unidirectional or bidirectional, and a control unit that controls the interference between the first small cell and the second small cell with a technique that differs according to a judgment result by the judgment unit.

Advantageous Effects of Invention

According to technology in accordance with the present disclosure, it is possible to suitably moderate inter-cell interference under conditions in which multiple small cells are present.

BRIEF DESCRIPTION OF DRAWINGS

FIG. 1 is an explanatory diagram for describing an overview of a system.

FIG. 2A is an explanatory diagram for describing a first case of interference that may occur when multiple small cells are present.

FIG. 2B is an explanatory diagram for describing a second case of interference that may occur when multiple small cells are present.

FIG. 2C is an explanatory diagram for describing a third case of interference that may occur when multiple small cells are present.

FIG. 6 is a table illustrating an example of interference control schemes that may be selected according to the type of interference.

FIG. 7 is a flowchart illustrating an example of the flow of a communication control process according to an embodiment.

FIG. 8 is a flowchart illustrating an example of a detailed flow of the interference classification process illustrated in FIG. 7.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Also, the description will proceed in the following order.
1. Overview of system
1-1. Examples of small cells
1-2. Types of interference
1-3. Cooperation manager (CM) placement
2. Cooperation manager configuration
2-1. Exemplary functional configuration
2-2. Process flow
3. Small cell base station configuration
4. Conclusion

1. OVERVIEW OF SYSTEM

[1-1. Examples of Small Cells]

Figure 3:
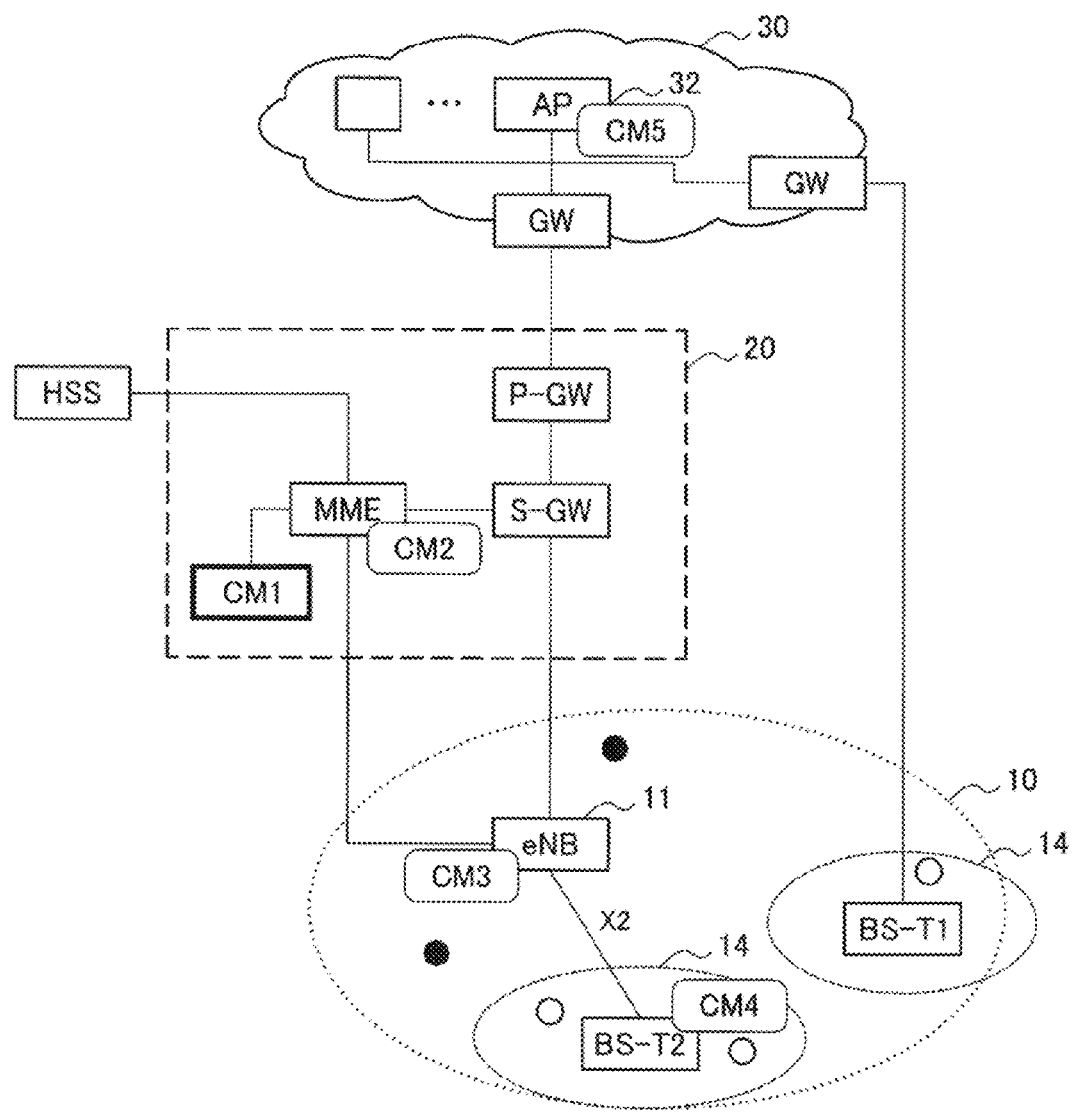
FIG. 3 is an explanatory diagram for describing several examples of the placement of a cooperation manager for the purpose of interference control.

First, FIGS. 1 to 3 will be used to describe an overview of a system. FIG. 1 illustrates a radio communication system 1 as an example. The radio communication system 1 may be a system based on an arbitrary cellular radio communication scheme, such as LTE, W-CDMA, CDMA2000, WiMAX, or LTE-A, for example.

Referring to FIG. 1, a base station 11 (for example, an eNB in LTE) that provides a radio communication service to a terminal within a macro cell 10 is illustrated. The radius of the macro cell is typically from several hundred meters to over ten kilometers. However, in spaces such as near the boundary of the macro cell, in the shadow of a building, underground, or indoors, a problem may occur in which communication becomes unavailable or the data rate becomes insufficient, as a result of lowered strength of the radio signal from the macro cell base station. Under such conditions, small cells may be introduced in order to supplement the macro cell and increase communication capacity. As discussed earlier, small cells are a concept that encompasses femto cells, nano cells, pico cells, micro cells, and the like, and are introduced by installing various types of small- to medium-scale base stations. Table 1 exemplifies several categories of small cell base stations.

TABLE 1

Categories and features of small cell base stations.

| Base station category | IF type | Access type | Expected location |
|---|---|---|---|
| Remote radio head (RRH) | Type 2 | Open | Outdoors |
| Hot zone base station | Type 2 | Open | Outdoors |
| Femto cell base station | Type 1 | Closed | Indoors |
| Relay node | Type 1 | Open | Outdoors |

In Table 1, "IF type" is a classification related to the interface with a macro cell base station. An RRH and a hot zone base station with an X2 interface with a macro cell base station may be classified as Type 2, while a femto cell base station and a relay node lacking an X2 interface may be classified as Type 1. "Access type" is a classification related to how the small cell is accessed from UE. The access type of an RRH, a hot zone base station, and a relay node is open, and as a general rule, all user devices are able to connect to the small cells of these base stations. On the other hand, the access type of a femto cell base station is closed, and as a general rule, only a limited group of user devices are able to connect to a femto cell.

FIG. 1 illustrates small cell base stations 16a, 16b, 16c, and 16d. The small cell base stations 16a, 16b, 16c, and 16d respectively provide radio communication service to terminals within small cells 14a, 14b, 14c, and 14d that at least partially overlap with the macro cell 10. In FIG. 1, terminals that connect to the macro cell are indicated by black circles, whereas terminals that connect to the small cells are indicated by white circles.

In the case in which a small cell is placed within a macro cell in this way, there is a risk of radio signals transmitted and received by the small cell interfering with a terminal connected to the macrocell. In order to avoid such risk, several interference control schemes are usable. The simplest interference control scheme may be separation of the frequency bands in use. However, under conditions in which frequency resources are depleted, it is not necessarily possible to always assign to the small cell a frequency band that differs from the frequency band in use by the macro cell. Consequently, an interference control scheme that cooperatively controls the transmit power or transmission rate of the macro cell and the small cell is beneficial, such as that proposed by the above Patent Literature 1. However, in the case in which multiple small cells are present, an interference control scheme that considers only the relationship between macro cell and small cell is insufficient.

[1-2. Types of Interference]

FIGS. 2A to 2C illustrate three typical cases of interference that may occur in the case in which multiple small cells are present. In the first case illustrated in FIG. 2A (interference case A), bidirectional interference occurs between two mutually neighboring small cells 14a and 14b. More specifically, in the area where the small cells 14a and 14b overlap, a terminal 18a connected to the small cell 14a receives interference caused by radio signals transmitted and received within the small cell 14b. Similarly, a terminal 18b connected to the small cell 14b receives interference caused by radio signals transmitted and received within the small cell 14a.

In the second case illustrated in FIG. 2B (interference case B), unidirectional interference from a small cell 14c to a small cell 14b occurs. More specifically, radio signals transmitted and received within the small cell 14b do not reach any of the terminals 18c connected to the small cell 14c. Radio signals transmitted from the base station 16c of the small cell 14c may exert interference exceeding an allowed level on a terminal 18b connected to the small cell 14b. This may occur because excessively large transmit power is allocated to the base station 16c as a result of the presence of an obstacle between the base station 11 of the macro cell and the base station 16c of the small cell 14c.

In the third case illustrated in FIG. 2C (interference case C), cumulative interference from two small cells 14a and 14d negatively influences a terminal connected to the macro cell. More specifically, for a terminal 12a positioned at a place between the small cells 14a and 14d, the sum of the interference caused by radio signals from a terminal 18a connected to the small cell 14a and the interference caused by radio signals from a terminal 18d connected to the small cell 14d exceeds an allowed level.

In order to suitably moderate the interference that is characteristic to these conditions in which multiple small cells are present, in the technology according to the present disclosure, a functional entity called a cooperation manager (CM) is introduced.

[1-3. Cooperation Manager (CM) Placement]

The cooperation manager may be placed on any communication node able to communication with the base station of a small cell. FIG. 3 is an explanatory diagram for describing several examples of the placement of a cooperation manager. In FIG. 3, an LTE-based network architecture is illustrated as an example. In an LTE-based network architecture, the base station (eNB) 11 of a macro cell 10 is connected to a core network 20. The core network 20 is implemented as the Evolved Packet Core (EPC), including a P-GW, an S-GW, and an MME, for example. The core network 20 is additionally connected to an external network 30. The external network 30 is an Internet Protocol (IP) network, also called a packet data network (PDN), and various application (AP) servers may be implemented on the external network 30.

Each of the nodes illustrated in FIG. 3 respectively has a role like the following. Note that although only representative nodes are illustrated herein, other types of nodes may also be included the network architecture.

Home Subscriber Server (HSS): a server that manages subscriber identification information, profile information, authentication information, and the like.

Mobility Management Entity (MME): an entity that exchanges non-access stratum (NAS) signals with UE, and conducts mobility management, session management, paging, and the like. The MME is connected to multiple eNBs.

PDN-Gateway (P-GW): a gateway, positioned at the junction between the EPC and the PDN, that assigns IP addresses to UE, attaches and deletes IP headers, and the like. The P-GW may also manage billing Serving-Gateway (S-GW): a gateway, positioned at the junction between the E-UTRAN and the EPC, that routes packets in the user plane. The S-GW becomes an anchor point in the case of UE handover between eNBs or between UTRANs.

Evolved Node B (eNB): a base station that realizes the radio link within a macro cell. Conducts radio resource management (RRM), radio bearer control, scheduling, and the like.

In a network architecture like that exemplified in FIG. 3, a cooperation manager may be placed as a new control node within the core network 20 (CM1). Alternatively, a cooperation manager may be placed as a new function on an existing control node (the MME, for example) within the core network 20 (CM2). Alternatively, a cooperation manager may be placed as a new function on the base station (eNB) of a macro cell (CM3). Alternatively, a cooperation manager may be placed as a new function on the base station of a small cell (CM4). Alternatively, a cooperation manager may be placed as a new server device within the external network 30 (CM5).

In any placement, the cooperation manager communicates with the base station of a macro cell and the base stations of small cells on a signaling link that includes the X2 interface (or some other logical/physical interface), the core network 20 or the external network 30, or the like. Additionally, the cooperation manager first allocates resources and transmit power to the small cells while accounting for the relationships between the macro cell and the individual small cells, and then categorizes the interference cases to address, and also controls the interference that is characteristic to the conditions in which multiple small cells are present.

2. COOPERATION MANAGER CONFIGURATION

[2-1. Exemplary Functional Configuration]

Figure 4:
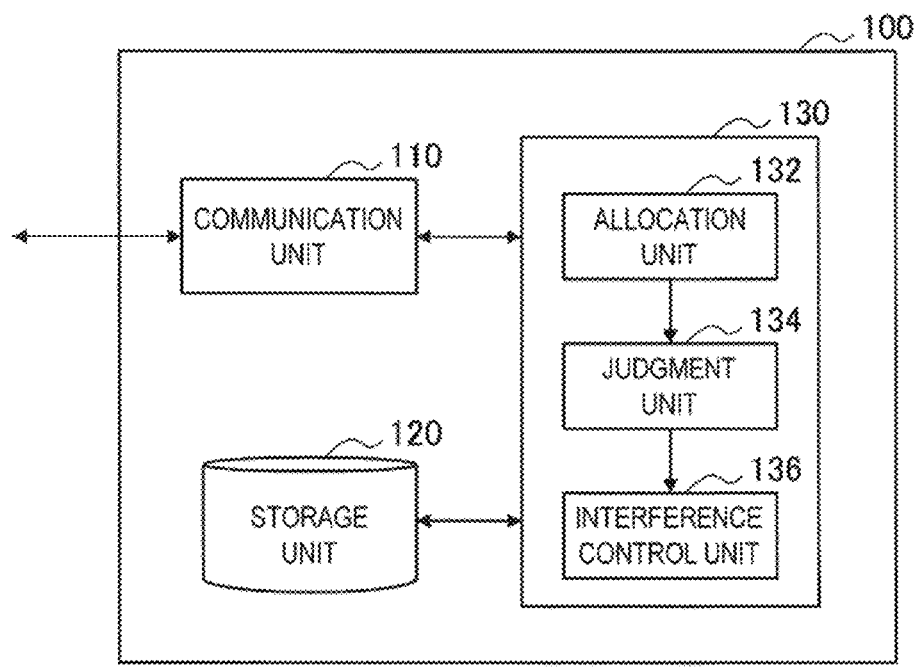
FIG. 4 is a block diagram illustrating an example of a configuration of a cooperation manager according to an embodiment.

FIG. 4 is a block diagram illustrating an example of a configuration of a cooperation manager 100. Referring to FIG. 4, the cooperation manager 100 is equipped with a communication unit 110, a storage unit 120, and a control unit 130.

(1) Communication Unit

The communication unit 110 is a communication module by which the cooperation manager 100 communicates with other nodes. The communication unit 110 may include a wireless communication module that includes an antenna and a radio frequency (RF) circuit, or include a wired communication module such as a local area network (LAN) port.

(2) Storage Unit

The storage unit 120 uses a storage medium such as a hard disk or semiconductor memory to store programs and data for the operation of the cooperation manager 100. For example, the storage unit 120 may store allocations of resources and transmit power to each small cell made by an allocation unit 132 discussed later. Also, the storage unit 120 may store a judgment threshold used when a judgment unit 134 discussed later categorizes an interference case.

(3) Control Unit

The control unit 130 corresponds to a processor such as a central processing unit (CPU) or a digital signal processor (DSP). The control unit 130 causes various functions of the cooperation manager 100 to operate by executing a program stored in the storage unit 120 or another storage medium. In the present embodiment, the control unit 130 includes three function modules: an allocation unit 132, a judgment unit 134, and an interference control unit 136.

(3-1) Allocation Unit

The allocation unit 132 allocates transmit power to each of one or more small cells so as to moderate the interference from each small cell on the macro cell of the radio communication system.

More specifically, in the present embodiment, the allocation unit 132 first computes per resource block allowed transmit power for each small cell. The allowed transmit power may take a larger value with greater path loss from the base station of a small cell to the base station of the macro cell. The allowed transmit power of a small cell may be moderated for resource blocks that are prioritized for usage in the macro cell. The allocation unit 132 may also compute per resource block the allowed transmit power of a small cell according to the technique described in the above Patent Literature 1, for example. Note that in the case in which the allowed transmit power computed for a small cell exceeds power corresponding to the number of terminals supportable by that small cell, the allocation unit 132 may decrease the allowed transmit power of that small cell.

Next, the allocation unit 132 allocates resources and transmit power to the broadcast channel of each small cell on the basis of the computed allowed transmit power. The broadcast channel herein may include a synchronization channel for terminal cell search and synchronization, as well as a control channel for signaling system information. For example, the allocation unit 132 may place the broadcast channel of a small cell in a resource block where relatively large transmit power is allowed for that small cell. In the case where a consecutive F (frequency direction)×T (time direction) number of resource blocks is required for a broadcast channel, the broadcast channel may be placed in a set of consecutive F×T resource blocks in which the minimum value of the allowed transmit power does not fall below a designated power level.

In the case in which there is contention among small cells for the resources to be allocated to the broadcast channel, the allocation unit 132 may adjust the allocation of resources and transmit power according to the access type of the small cell.

For example, the allocation unit 132 may prioritize the communication opportunities of open-access type small cells over closed-access type small cells. In other words, in the case of resource contention between a closed-access type small cell and an open-access type small cell, the allocation unit 132 first places the broadcast channel of the open-access type small cell in a resource block with larger allowed transmit power. Subsequently, the allocation unit 132 decreases the allowed transmit power of the closed-access type small cell. As a result, the resource contention may be resolved. Alternatively, the allocation unit 132 may also place the broadcast channel of the closed-access type small cell in the (set of) resource blocks with the next largest allowed transmit power, without decreasing the allowed transmit power of the closed-access type small cell. By prioritizing open-access type small cells in this way, it becomes possible to provide communication opportunities to more users. Also, the installation of open-access type small cells is encouraged, and the system's overall ability to support terminals may be raised.

Also, in the case of resource contention between multiple open-access type small cells, the allocation unit 132 may adjust the allocation of resources and transmit power according to the estimated numbers of terminals in those small cells. An estimated number of terminals may be determined on the basis of terminal position data reported from a terminal or a base station to the cooperation manager. For example, the allocation unit 132 decreases the allowed transmit power of a small cell with a lower estimated number of terminals. As a result, the resource contention may be resolved. Alternatively, the allocation unit 132 may also place the broadcast channel of a small cell with a lower estimated number of terminals in the (set of) resource blocks with the next largest allowed transmit power, without decreasing the allowed transmit power of the small cell.

Also, in the case of resource contention between multiple closed-access type small cells, the allocation unit 132 may adjust the allocation of resources and transmit power so that communication opportunities are fairly distributed among those small cells. In this case, the allocation unit 132 uniformly decreases the allowed transmit power of the small cells contending for resources (for example, with a fixed decrement or a fixed rate of decrease). As a result, the resource contention may be resolved. Alternatively, the allocation unit 132 may also place the broadcast channel of any of the small cells in the (set of) resource blocks with the next largest allowed transmit power, without decreasing the allowed transmit power of the small cell.

(3-2) Judgment Unit

After the allocation unit 132 decides the placement and transmit power for the broadcast channel of each small cell, it becomes possible to estimate the placement and transmit power for the data channels of each small cell. The uplink and downlink data channels may be placed in resource blocks between periodically placed broadcast channels, for example. The transmit power of a data channel may be estimated to be equal to the transmit power of the broadcast channel, or estimated to be lower.

The judgment unit 134, on the basis of the resource and transmit power allocation by the allocation unit 132, estimates the interference caused by the transmission of radio signals on the broadcast channel and data channels from each small cell. Subsequently, in the case of interference that exceeds an allowed level, the judgment unit 134 executes a classification of interference cases.

More specifically, for respective pairs of small cells, the judgment unit 134 estimates per resource block the interference level from the second small cell at the cell edge of the first small cell. Subsequently, in the case in which the estimated interference level exceeds an allowed level in a number of resource blocks that exceeds a designated ratio, the judgment unit 134 may judge that the interference on the first small cell from the second small cell is not allowed. In this case, the judgment unit 134 additionally judges whether the interference between the first and second small cells is unidirectional or bidirectional. At this point, in the case of bidirectional interference, the judgment unit 134 classifies the interference between the first and second small cells into the interference case A that was described using FIG. 2A. On the other hand, in the case of unidirectional interference, the judgment unit 134 classifies the interference between the first and second small cells into the interference case B that was described using FIG. 2B. Note that the above designated ratio may be statically configured (such as 10% to 20%, for example), or dynamically configured according to a parameter such as the transmission duty cycle per small cell.

Figure 5A:
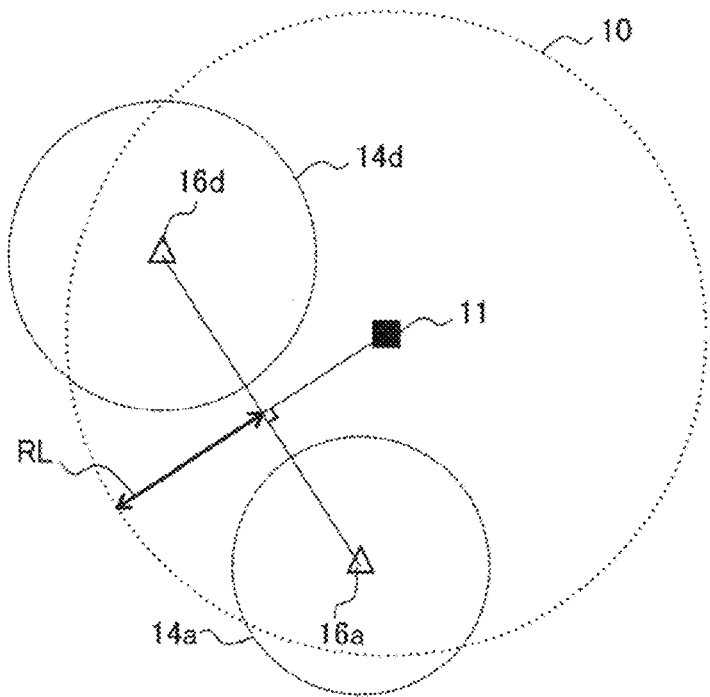
FIG. 5A is a first explanatory diagram for describing the estimation of cumulative interference caused by multiple small cells.
Figure 5B:
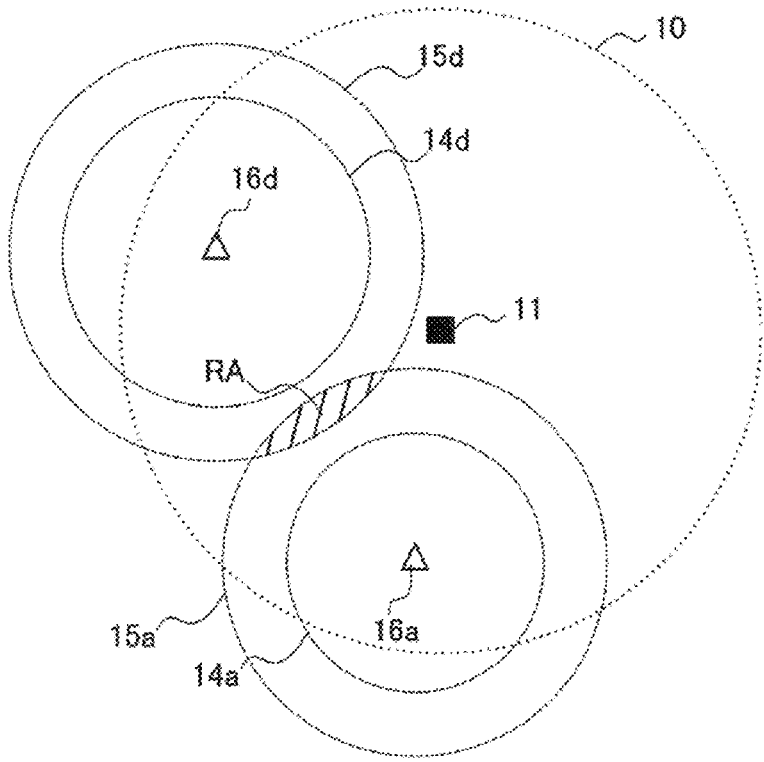
FIG. 5B is a second explanatory diagram for describing the estimation of cumulative interference caused by multiple small cells.

Also, in the present embodiment, the judgment unit 134 may additionally judge whether or not the cumulative interference from multiple small cell onto a terminal connected to the macro cell exceeds an allowed level. For example, the judgment unit 134 estimates the interference level caused by radio signals from each of the multiple small cells at a place between the base stations of the multiple small cells, and compares the cumulative value of the estimated interference level to an allowed level. In the example of FIG. 5A, the normal line dropped from the eNB 11 to the line joining the base station 16a of the small cell 14a and the base station 16d of the small cell 14d is extended to the edge of the macro cell 10. The cumulative interference may also be evaluated by supposing that a terminal connected to the macro cell is present on a reference line RL along such a normal line. Such an evaluation is valuable in the case in which interference caused by downlink signals of the small cells is dominant. On the other hand, in the example of FIG. 5B, boundaries 15a and 15d of the areas in which a designated signal level (−110 dBm/6 MHz, for example) is detected are computed for the small cells 14a and 14d, respectively. The cumulative interference may also be evaluated by supposing that a terminal connected to the macro cell is present in the overlapping portion of these areas (the shaded portion in the drawing). Such an evaluation is valuable in the case in which the cause of the dominant interference is not specified. The judgment unit 134 follows such a procedure to detect a pair of small cells that exerts cumulative interference exceeding an allowed level on a macro cell terminal, and classifies the cumulative interference into the interference case C that was described using FIG. 2C.

(3-3) Interference Control Unit

The interference control unit 136 controls inter-cell interference in conditions in which multiple small cells are present, according to a technique that differs depending on the judgment result by the judgment unit 134. FIG. 6 illustrates an example of interference control schemes that may be selected by the interference control unit 136 according to a judgment result (that is, an interference classification) by the judgment unit 134.

For example, the interference control unit 136 controls the scheduling of at least one of the first and second small cells so that the same radio resource (that is, a resource block) is not simultaneously used by a pair of small cells involved in the interference case A. Resource blocks in which interference is likely to occur may also be alternately allocated to the first and second small cells in a round-robin scheme. Also, more or earlier resource blocks may be allocated to one of the small cells according to a priority that may depend on parameters such as latency, throughput, or other communication requirements, application importance, or communication quality.

Also, the interference control unit 136 issues a request for decreasing transmit power to the base station of the small cell on the interfering side of a pair of small cells involved in the interference case B, for example. The interference case B may be resolved if the base station of the small cell on the interfering side accepts the decrease in transmit power. In the case in which the base station of the small cell on the interfering side does not accept the decrease in transmit power, the interference control unit 136 may control the scheduling of at least one of small cells on the interfered side and the interfering side so that the same radio resource is not simultaneously used.

Also, in the case in which cumulative interference classified into the interference case C is estimated, the interference control unit 136 requests the base station of the macro cell to increase the interference immunity of radio signals transmitted between the macro cell terminal receiving the cumulative interference and the base station of the macro cell, for example. The interference immunity of a radio signal may be increased by increasing the transmit power, or by using a lower-rate modulation scheme, for example. Alternatively, the interference control unit 136 may control the scheduling of the small cell on the interfering side so that radio resources used in the macro cell are not simultaneously used in the small cell on the interfering side. In addition, the interference control unit 136 may also request the base station of the small cell on the interfering side to decrease the transmit power.

Note that although FIG. 6 illustrates three exemplary interference cases, any of these interference cases may be omitted from classification, or additional interference cases may be adopted. Also, interference control may be executed in units of multiple resource blocks instead of being executed in units of single resource blocks. As a result, the load on the cooperation manager 100 and the signaling load on the network may be alleviated.

[2-2. Process Flow]

(1) Overall Flow

FIG. 7 is a flowchart illustrating an example of the flow of a communication control process by a cooperation manager 100 according to the present embodiment.

Referring to FIG. 7, first, the allocation unit 132 computes per resource block allowed transmit power for each small cell (step S110). Next, the allocation unit 132 allocates resources and transmit power for a broadcast channel to each small cell, on the basis of the computed allowed transmit power (step S120).

Next, the judgment unit 134, on the basis of the resource and transmit power allocation by the allocation unit 132, estimates the interference caused by the transmission of uplink signals and downlink signals on the data channels from each small cell (step S130). Next, the judgment unit 134 executes the interference classification process to be described using FIG. 8 (step S140).

Subsequently, the interference control unit 136 moderates interference between cells under conditions in which multiple small cells are present, according to a technique (for example, one of the techniques illustrated in FIG. 6) that differs depending on the result of the interference classification process (step S150).

(2) Interference Classification Process

FIG. 8 is a flowchart illustrating an example of a detailed flow of the interference classification process in step S140 of FIG. 7.

Referring to FIG. 8, first, the judgment unit 134 selects one from among one or more pairs of small cells operating within the macro cell being controlled as the current pair (step S141).

Next, the judgment unit 134 judges whether or not the estimated interference level from at least one of the small cells in the current pair on the other small cell exceeds an allowed level in a number of resource blocks exceeding a designated ratio (step S142). At this point, the process proceeds to step S146 in the case in which neither small cell satisfies the above condition as the interfering side. On the other hand, the process proceeds to step S143 in the case in which the above condition is satisfied.

In step S143, the judgment unit 134 judges whether or not the interference discussed above is bidirectional (step S143). For example, the interference is bidirectional in the case in which both small cells satisfy the condition described in step S142 as the interfering side. If the interference is bidirectional, the judgment unit 134 classifies the interference involving the current pair into the interference case A (step S144). On the other hand, if the interference is unidirectional, the judgment unit 134 classifies the interference involving the current pair into the interference case B (step S145).

Meanwhile, in step S146, the judgment unit 134 judges whether or not the cumulative interference estimated at a place between the small cells of the current pair exceeds an allowed level of the macro cell (step S146). At this point, if the estimated cumulative interference exceeds the allowed level of the macro cell, the judgment unit 134 classifies the interference involving the current pair into the interference case C (step S147). Otherwise, the level of interference involving the current pair is sufficiently low, and thus the interference is not classified into any of the interference cases.

After that, if a next small cell pair with an unfinished classification exists, the process returns to step S141. On the other hand, if classification has finished for all pairs, the interference classification process of FIG. 8 ends (step S148).

3. SMALL CELL BASE STATION CONFIGURATION

Figure 9:
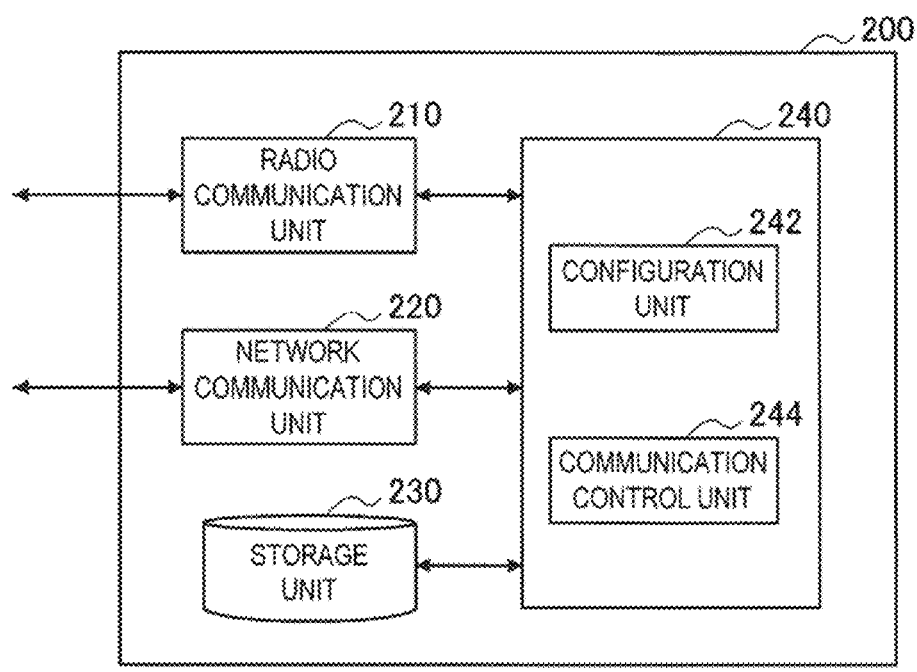
FIG. 9 is a block diagram illustrating an example of a configuration of a base station according to an embodiment.

The small cell base station 200 constitutes a communication control system together with the cooperation manager 100 discussed above. FIG. 9 is a block diagram illustrating an example of a configuration of a small cell base station 200 according to the present embodiment. Referring to FIG. 9, the base station 200 is equipped with a radio communication unit 210, a network communication unit 220, a storage unit 230, and a control unit 240.

(1) Radio Communication Unit

The radio communication unit 210 is a radio communication module for providing a radio communication service to a terminal connected to the small cell. The radio communication unit 210 includes an antenna and an RF circuit. The transmit power of a radio signal transmitted from the radio communication unit 210 is moderated to be within a range controlled by the cooperation manager 100.

(2) Network Communication Unit

The network communication unit 220 is a communication module for communication between the small cell base station 200 and a control node such as the cooperation manager 100. The network communication unit 220 may include a wireless communication module that may be shared with the radio communication unit 210, or include a wired communication module such as a LAN port.

(3) Storage Unit

The storage unit 230 uses a storage medium such as a hard disk or semiconductor memory to store programs and data for the operation of the base station 200. For example, the storage unit 230 may store allocations of resources and transmit power designated by the cooperation manager 100.

(4) Control Unit

The control unit 240 corresponds to a processor such as a CPU or DSP. The control unit 240 causes various functions of the base station 200 to operate by executing a program stored in the storage unit 230 or another storage medium. In the present embodiment, the control unit 240 includes two function modules: a configuration unit 242 and a communication control unit 244.

(4-1) Configuration Unit

The configuration unit 242 configures communication parameters for radio communication with a terminal connected to the small cell, in accordance with an interference control signal received by the network communication unit 220. For example, the configuration unit 242 configures a broadcast channel in a resource block specified by the interference control signal. Also, the configuration unit 242 configures the transmit power of the radio communication unit 210 to a value specified by the interference control signal. In the case of receiving a request to decrease the transmit power from the cooperation manager 100, the configuration unit 242 decreases the transmit power configured in the radio communication unit 210. Note that the configuration unit 242 may also not accept the above request in the case of judging that a desired communication quality cannot be maintained if the transmit power is decreased.

(4-2) Communication Control Unit

The communication control unit 244 controls radio communication with a terminal connected to the small cell. For example, the communication control unit 244 broadcasts a synchronization signal for cell search and synchronization as well as system information on a broadcast channel configured by the configuration unit 242. Also, the communication control unit 244 allocates to each terminal resource blocks on data channels that may be positioned between broadcast channels. Subsequently, the communication control unit 244 causes the radio communication unit 210 to receive uplink signals and transmit downlink signals in accordance with the resource block allocation. Additionally, the communication control unit 244 controls the transmit power of each terminal connected to the small cell, to be within a range allowed by the cooperation manager 100.

4. CONCLUSION

The foregoing thus describes an embodiment of technology according to the present disclosure in detail using FIGS. 1 to 9. According to the embodiment discussed in the foregoing, interference between small cells is at least classified according to whether the interference is unidirectional or bidirectional, and interference is moderated with a technique that differs depending on the classification. Consequently, compared to an interference control scheme that does not depend on interference classification, it is possible to more suitably moderate inter-cell interference under conditions in which multiple small cells are present.

For example, in the case of unidirectional interference, the base station of the small cell on the interfering side may be requested to decrease the transmit power. Consequently, by decreasing the transmit power of the small cell that is obtained too many communication opportunities, it is possible to moderate interference while maintaining the communication opportunities of the small cell on the interfered side.

As another example, in the case of bidirectional interference, the scheduling of two small cells involved with the interference may be controlled so that these small cells do not use the same radio resource simultaneously. Consequently, interference may be moderated by fairly reducing communication opportunities for small cells that are equally responsible for interference.

As another example, in the case in which the cumulative interference from multiple small cells exerts interference exceeding an allowed level on a macro cell terminal, the cumulative interference is also moderated. Consequently, it is possible to safely introduce multiple small cells while suitably protecting communication by macro cell terminals. For example, by increasing the interference immunity of a radio signal on the macro cell side, the relative level of cumulative interference with respect to the allowed interference level may be moderated. In this case, it is possible to prevent the adverse effects of interference without reducing the communication opportunities of the small cells involved with the cumulative interference.

According to the embodiment discussed in the foregoing, resources and transmit power are first allocated to a broadcast channel of a small cell, and then the interference caused by transmission on a data channel from the small cell is estimated in units of single or multiple resource blocks on the basis of the allocation. Consequently, compared to a technique that does not distinguish types of channels when estimating interference, it is possible to rationally estimate the interference level that may vary per resource block.

Note that the series of control processes conducted by the devices described in this specification may be realized in any of software, hardware, and a combination of software and hardware. A program constituting software is stored in advance in a storage medium (a non-transitory medium) provided internally or externally to each device, for example. Each program is then loaded into RAM at runtime and executed by a processor such as a CPU, for example.

The foregoing thus describes preferred embodiments of the present disclosure in detail and with reference to the attached drawings. However, the technical scope of the present disclosure is not limited to such examples. It is clear to persons ordinarily skilled in the technical field of the present disclosure that various modifications or alterations may occur insofar as they are within the scope of the technical ideas stated in the claims, and it is to be understood that such modifications or alterations obviously belong to the technical scope of the present disclosure.

Additionally, the present technology may also be configured as below.

(1)
A communication control device including:
an allocation unit that allocates transmit power to each of one or more small cells so as to moderate interference on a macro cell of a radio communication system from each small cell that at least partially overlaps with the macro cell;
a judgment unit that, in a case in which there exists a second small cell that exerts interference exceeding an allowed level on a first small cell, judges whether the interference is unidirectional or bidirectional; and
a control unit that controls the interference between the first small cell and the second small cell with a technique that differs according to a judgment result by the judgment unit.

(2)
The communication control device according to (1), wherein
in a case in which the interference between the first small cell and the second small cell is unidirectional, the control unit requests a base station of the second small cell to decrease transmit power.

(3)
The communication control device according to (1) or (2), wherein
in a case in which the interference between the first small cell and the second small cell is bidirectional, the control unit controls scheduling of at least one of the first small cell and the second small cell so that the same radio resource is not used simultaneously in the first small cell and the second small cell.

(4)
The communication control device according to (2), wherein
in a case in which the base station of the second small cell does not accept the request, the control unit controls scheduling of at least one of the first small cell and the second small cell so that the same radio resource is not used simultaneously in the first small cell and the second small cell.

(5)
The communication control device according to any one of (1) to (4), wherein
the judgment unit additionally judges whether or not cumulative interference from a plurality of small cells on a terminal connected to the macro cell exceeds an allowed level, and
in a case in which the cumulative interference is judged to exceed the allowed level, the control unit controls at least one base station of the macro cell or base station of the plurality of small cells so that the cumulative interference is moderated.

(6)
The communication control device according to (5), wherein
the judgment unit estimates an interference level caused by a radio signal from each of the plurality of small cells at a place between the base stations of the plurality of small cells, and compares a cumulative value of the estimated interference level to the allowed level.

(7)
The communication control device according to (5) or (6), wherein
in a case in which the cumulative interference is judged to exceed the allowed level, the control unit increases an interference immunity of a radio signal transmitted between the terminal and base station of the macro cell.

(8)
The communication control device according to (5) or (6), wherein
in a case in which the cumulative interference is judged to exceed the allowed level, the control unit controls scheduling of the plurality of small cells so that a radio resource used by the terminal in the macro cell is not used simultaneously in the plurality of small cells.

(9)
The communication control device according to any one of (1) to (8), wherein
the allocation unit allocates a resource and transmit power to a broadcast channel of each small cell on the basis of allowed transmit power for each small cell computed per resource block, and
the judgment unit estimates interference caused by transmission of a radio signal from each small cell on the basis of the allocation of the resource and the transmit power to each small cell.

(10)
The communication control device according to (9), wherein
the allocation unit allocates the resource and the transmit power so that a communication opportunity of an open-access type small cell is prioritized over a closed-access type small cell.

(11)
A communication control method including:
allocating transmit power to each of one or more small cells so as to moderate interference on a macro cell of a radio communication system from each small cell that at least partially overlaps with the macro cell;
judging, in a case in which there exists a second small cell that exerts interference exceeding an allowed level on a first small cell, whether the interference is unidirectional or bidirectional; and
controlling the interference between the first small cell and the second small cell with a technique that differs according to a result of the judging.

(12)
A communication control system including:
base stations of a first small cell and a second small cell that at least partially overlap with a macro cell of a radio communication system; and
a communication control device that includes
an allocation unit that allocates transmit power to each of the first small cell and the second small cell so as to moderate interference from the first small cell and the second small cell on the macro cell,
a judgment unit that, in a case in which one of the first small cell and the second small cell exerts interference exceeding an allowed level on the other, judges whether the interference is unidirectional or bidirectional, and
a control unit that controls the interference between the first small cell and the second small cell with a technique that differs according to a judgment result by the judgment unit.

REFERENCE SIGNS LIST 10 macro cell
11 macro cell base station
14a to 14d small cell
100 cooperation manager (communication control device)
132 allocation unit
134 judgment unit
136 interference control unit
16a to 16d, 200 small cell base station

The invention claimed is:

1. A communication control device comprising:
an allocation unit that allocates transmit power to each of one or more small cells so as to moderate interference on a macro cell of a radio communication system from each small cell that at least partially overlaps with the macro cell;
a judgment unit that, in a case in which there exists a second small cell that exerts interference exceeding an allowed level on a first small cell, judges whether the interference is unidirectional or bidirectional; and
a control unit that controls the interference between the first small cell and the second small cell with a technique that differs according to a judgment result by the judgment unit.

2. The communication control device according to claim 1, wherein
in a case in which the interference between the first small cell and the second small cell is unidirectional, the control unit requests a base station of the second small cell to decrease transmit power.

3. The communication control device according to claim 1, wherein
in a case in which the interference between the first small cell and the second small cell is bidirectional, the control unit controls scheduling of at least one of the first small cell and the second small cell so that the same radio resource is not used simultaneously in the first small cell and the second small cell.

4. The communication control device according to claim 2, wherein
in a case in which the base station of the second small cell does not accept the request, the control unit controls scheduling of at least one of the first small cell and the second small cell so that the same radio resource is not used simultaneously in the first small cell and the second small cell.

5. The communication control device according to claim 1, wherein
the judgment unit additionally judges whether or not cumulative interference from a plurality of small cells on a terminal connected to the macro cell exceeds an allowed level, and
in a case in which the cumulative interference is judged to exceed the allowed level, the control unit controls at least one base station of the macro cell or base station of the plurality of small cells so that the cumulative interference is moderated.

6. The communication control device according to claim 5, wherein
the judgment unit estimates an interference level caused by a radio signal from each of the plurality of small cells at a place between the base stations of the plurality of small cells, and compares a cumulative value of the estimated interference level to the allowed level.

7. The communication control device according to claim 5, wherein
in a case in which the cumulative interference is judged to exceed the allowed level, the control unit increases an interference immunity of a radio signal transmitted between the terminal and base station of the macro cell.

8. The communication control device according to claim 5, wherein
in a case in which the cumulative interference is judged to exceed the allowed level, the control unit controls scheduling of the plurality of small cells so that a radio resource used by the terminal in the macro cell is not used simultaneously in the plurality of small cells.

9. The communication control device according to claim 1, wherein
the allocation unit allocates a resource and transmit power to a broadcast channel of each small cell on the basis of allowed transmit power for each small cell computed per resource block, and
the judgment unit estimates interference caused by transmission of a radio signal from each small cell on the basis of the allocation of the resource and the transmit power to each small cell.

10. The communication control device according to claim 9, wherein
the allocation unit allocates the resource and the transmit power so that a communication opportunity of an open-access type small cell is prioritized over a closed-access type small cell.

11. A communication control method comprising:
allocating transmit power to each of one or more small cells so as to moderate interference on a macro cell of a radio communication system from each small cell that at least partially overlaps with the macro cell;
judging, in a case in which there exists a second small cell that exerts interference exceeding an allowed level on a first small cell, whether the interference is unidirectional or bidirectional; and
controlling the interference between the first small cell and the second small cell with a technique that differs according to a result of the judging.

12. A communication control system comprising:
base stations of a first small cell and a second small cell that at least partially overlap with a macro cell of a radio communication system; and
a communication control device that includes
an allocation unit that allocates transmit power to each of the first small cell and the second small cell so as to moderate interference from the first small cell and the second small cell on the macro cell,
a judgment unit that, in a case in which one of the first small cell and the second small cell exerts interference exceeding an allowed level on the other, judges whether the interference is unidirectional or bidirectional, and
a control unit that controls the interference between the first small cell and the second small cell with a technique that differs according to a judgment result by the judgment unit.

* * * * *